(12) United States Patent
Seim et al.

(10) Patent No.: US 11,229,218 B2
(45) Date of Patent: Jan. 25, 2022

(54) GUTTING MACHINE AND A METHOD FOR GUTTING FISH IN A GUTTING MACHINE

(71) Applicant: KNURO AS, Bergen (NO)

(72) Inventors: Knut Inge Seim, Fana (NO); Ronny Solberg, Kleppesto (NO)

(73) Assignee: KNURO AS, Bergen (NO)

( * ) Notice: Subject to any disclaimer, the term of this patent is extended or adjusted under 35 U.S.C. 154(b) by 0 days.

(21) Appl. No.: 16/967,859

(22) PCT Filed: Feb. 4, 2019

(86) PCT No.: PCT/NO2019/050031
§ 371 (c)(1),
(2) Date: Aug. 6, 2020

(87) PCT Pub. No.: WO2019/156570
PCT Pub. Date: Aug. 15, 2019

(65) Prior Publication Data
US 2021/0045394 A1 Feb. 18, 2021

(30) Foreign Application Priority Data
Feb. 7, 2018 (NO) .................................. 20180194

(51) Int. Cl.
*A22C 25/00* (2006.01)
*A22C 25/14* (2006.01)
*A22C 25/08* (2006.01)

(52) U.S. Cl.
CPC ............ *A22C 25/145* (2013.01); *A22C 25/08* (2013.01)

(58) Field of Classification Search
CPC ........ A22C 25/00; A22C 25/145; A22C 25/14
(Continued)

(56) References Cited

U.S. PATENT DOCUMENTS 2,832,988 A   5/1958  Schlichting
5,413,524 A   5/1995  Yoshida
(Continued)

FOREIGN PATENT DOCUMENTS

AU       489472     2/1976
BE       477800 A   1/1948
(Continued)

OTHER PUBLICATIONS

International Search Report and Written Opinion dated Apr. 15, 2019 (PCT/NO2019/050031).
(Continued)

*Primary Examiner* — Richard T Price, Jr.
(74) *Attorney, Agent, or Firm* — Alix, Yale & Ristas, LLP (57) ABSTRACT

Gutting machine for fish, comprising a conveyor belt to receive fish, where the fish is placed with the abdomen facing a number of cutting and cleaning tools for gutting and cleaning of the fish when it is transported on said conveyor belt, in which said conveyor belt is equipped with a number of holding devices where respective holding devices are adapted for firmly holding the fish, and that one or more barriers arranged adjoining said conveyor belt are adapted to slow down the movement of the fish until the fish is firmly held in a respective holding device and is brought by the conveyor belt in its direction of movement. Also described is a method for gutting the fish in a gutting machine.

17 Claims, 6 Drawing Sheets

(58) Field of Classification Search
USPC .......................................................... 452/106
See application file for complete search history.

(56) References Cited

U.S. PATENT DOCUMENTS

| | | | |
|---|---|---|---|
| 5,980,376 | A | 11/1999 | Grosseholz et al. |
| 6,368,203 | B1 | 4/2002 | Puretz |
| 7,623,249 | B2 * | 11/2009 | Sandberg ........... A22C 17/0033 |
| | | | 250/223 R |
| 10,470,472 | B2 * | 11/2019 | Tsukagoshi ............ A22C 25/08 |
| 10,588,323 | B2 * | 3/2020 | Herbst ................... A22C 25/12 |
| 2004/0203331 | A1 | 10/2004 | Grobeholz et al. |
| 2013/0040544 | A1 | 2/2013 | Ryan |
| 2013/0189913 | A1 * | 7/2013 | Ryan .................... A22C 25/142 |
| | | | 452/170 |
| 2018/0027828 | A1 | 2/2018 | Jakobsen |

FOREIGN PATENT DOCUMENTS

| | | |
|---|---|---|
| DE | 19829376 A1 | 2/1999 |
| ES | 2169001 A1 | 6/2002 |
| WO | 0109587 A1 | 2/2001 |
| WO | 0132025 A1 | 5/2001 |
| WO | 2017175800 A1 | 10/2017 |
| WO | 2017186275 A1 | 11/2017 |

OTHER PUBLICATIONS

International Preliminary Report on Patentability dated Apr. 21, 2020 (PCT/NO2019/050031).

* cited by examiner

GUTTING MACHINE AND A METHOD FOR GUTTING FISH IN A GUTTING MACHINE

BACKGROUND

The disclosure relates to a gutting machine for fish and a method for gutting of fish in a gutting machine, where the gutting machine comprises a conveyor belt to receive the fish, where the fish is placed with the abdomen facing a number of cutting and cleaning tools for the gutting and cleaning of the fish when it is transported on said conveyor belt.

Today, gutting fish is partially manual because there are no automatic devices that can carry out a satisfactory job.

The machines today are very inefficient and there is a need for more efficient devices.

Solutions are known where the fish is fed into a gutting machine with the tail first and pulled through the machine by a tail clamp. Thereafter, the fish is measured and gutted. The problem with these machines is that the fish misses the tail clamp, there is also fish that is cut incorrectly and there is fish that falls out of the machine because of tail clamp problems. By increasing the capacity of these known gutting machines, the tail clamp problem and also other problems such cutting errors will be amplified.

Reference is made to the publication US 200403331 that describes a method and appliance for the gutting of fish that is whole or without a head and which is transported on a conveyor belt.

The publication WO 2017186275 describes a device for optical inspection of the abdominal cavity for gutted fish on a conveyor belt.

The publication WO 0109587 describes a conveyor belt connected to a light source and a light receiver which are used to measure the quality of the characteristics of the fish.

SUMMARY

The disclosed embodiments allow, for one thing, removal of the problem with the tail clamp and also to be able to increase the capacity of a gutting machine. This makes it possible to be able to gut more fish in a smaller area, and also to increase the capacity of existing factories and possibly gut the fish directly on boats where there is not much space and one needs a large capacity.

There are also hygienic considerations and maintenance costs both of which will be improved when compared to using the device with the tail clamp.

One of the advantages of the disclosed embodiments is that the fish does not need to be in a correct position with it enters the gutting machine, as the fish is forced into a correct position, providing a better starting point for the proper fastening of the fish.

Therefore, a gutting machine and a method are provided where the fish is received arbitrarily on the conveyor belt, whereupon the fish is held firmly and is brought further to a subsequent treatment.

The disclosed new and improved gutting machine avoids the above-mentioned disadvantages, for one thing.

The embodiments can be used for all kinds of fish but are particularly suited to salmon and trout.

Provided herein is a gutting machine for fish, where the gutting machine comprises a conveyor belt to receive the fish, where the fish is placed with the abdomen facing a number of cutting and cleaning tools for the gutting and cleaning of the fish when it is transported on said conveyor belt. Said conveyor belt is equipped with a number of holding devices, where the respective holding device is adapted to keep the fish in a firm grip. The gutting machine further comprises one or more barriers arranged adjoining said conveyor belt and which are adapted to dampen the movement of the fish until the fish is held firmly in the holding device and is brought by the conveyor belt in the direction of movement.

Respective holding device is preferably adapted to hold firmly the part of the fish that faces the direction of movement of said conveyor belt.

The holding device can be a wedge unit adapted to receive and firmly wedge the head of the fish or the tail section.

Each wedge unit can comprise a pair of wedging arms adapted to receive and firmly wedge the head or tail section of the fish. Said wedging arms can be placed side by side, where each wedging arm can comprise a first, upwardly extending section and a second, mainly horizontal section.

The second, mainly horizontal section of each wedging arm can extend to the front or to the rear in the direction of movement of the conveyor belt. The mainly upwardly extending section of each wedging arm can also form an angle with respect to each other for the formation of a V-shaped wedge.

The conveyor belt can comprise a number of carriers to support the fish and which can be formed by several upwardly extending pairs of support arms with subsequent pairs of support arms to form an approximately V-formed duct.

Furthermore, several holding devices can be placed mutually apart on the conveyor belt, where the distance between respective holding devices is adjusted to the length of the fish.

The barrier is preferably a stationary and rotary barrier and can, after it has slowed down the movements of the fish, be adapted to rotate to let the fish pass.

During the rotary movement, the barrier can be adapted to follow the shape of the fish, whereby the size and profile of the fish can be determined. Furthermore, the barrier can comprise one or more sensors to register the movement of the fish and also to determine the size and profile of the fish.

Said cutting and cleaning tool can, on a signal from said sensors in the barrier, start the gutting process of the fish.

In an alternative embodiment the barrier can be formed as a second conveyor belt arranged above the conveyor belt that supports the fish, where said second conveyor belt is adapted to be lowered down to a position over the fish so that the movement of the fish is slowed down.

In a further embodiment, the barrier can be formed as two conveyor belts arranged side by side to the conveyor belt that supports the fish, where said two side-by-side conveyor belts are adapted to be led into a position on respective sides of the fish so that the movement of the fish is slowed down.

The holding device can alternatively also be a clamping device, or a penetration device adapted to firmly hold the fish.

Also disclosed is a method for gutting of fish in a gutting machine, said gutting machine comprises a conveyor belt to receive the fish and a number of cutting and cleaning tools for gutting and cleaning of the fish when it is transported on said conveyor belt, where the method comprises that the fish are dropped down arbitrarily on the conveyor belt one by one and that the fish, after it has been received and lies on the conveyor belt, is slowed down or held back, whereupon the fish is firmly held and is brought by the conveyor belt to the subsequent gutting and cleaning by said cutting and cleaning tool.

It is preferred that the part of the fish that faces the direction of movement of the conveyor belt is held firmly onto the conveyor belt.

After the fish has been held firmly and is brought along by the conveyor belt, the size and profile of the fish can be determined.

The part of the fish that faces the direction of movement of the conveyor belt is preferably the tail section of the fish. Furthermore, the fish can be placed with the abdomen up on the conveyor belt.

The size of the fish and its profile can be determined by a stationary and rotary barrier which traces the fish shape when it is moved passed by the conveyor belt.

Furthermore, the fish can be slowed down or held back by one or more barriers placed adjoining to and lying above the conveyor belt.

It is preferred that the conveyor belt is equipped with a number of holding devices, which the fish can be wedged into.

Said holding devices can grip and wedge or firmly hold onto the part of the fish that faces the direction of movement of the conveyor belt, so that the fish is stabilised and centred to be transported further on the conveyor belt.

After the size and profile of the fish have been decided, a signal is sent to said cutting and cleaning tool to start the gutting process of the fish.

BRIEF DESCRIPTION OF THE DRAWINGS

Preferred embodiments of the invention shall now be described in the following in more detail with reference to the enclosed figures, in which.

DETAILED DESCRIPTION

Figure 1:
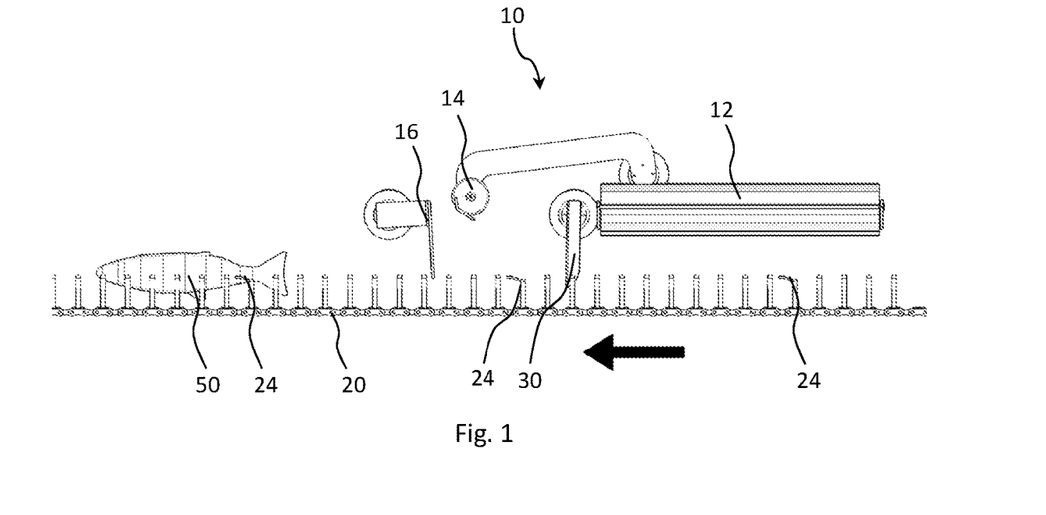
FIG. 1 shows a principle drawing of a gutting machine according to the disclosure.

FIG. 1 shows a principle drawing of a gutting machine 10 according to the disclosure. The gutting machine 10 comprises a duct-formed receiving unit 12, which, on a signal, opens and drops fish 50 down onto one or more conveyor belts 20.

Furthermore, the gutting machine 20 is, in a known way, equipped with a number of cutting and cleaning tools 14,16. Said cleaning tools can be vacuum tools, scraping tools, brushing tools, flushing tools, or other tools that are suited to the cleaning of the abdomen cavity of a fish.

The cutting and cleaning tools 14,16 are preferably mounted onto separate rotary arms, where the respective rotary arms are coupled to a drive motor 14a, 16a.

The fish 50 is let down onto the conveyor belt 20 from the receiving unit 12 so that it lies with the abdomen facing said cutting and cleaning tools 14,16, usually as shown in the figures with the abdomen up and head facing forwards in the direction of movement of the conveyor belt 20, or alternatively with the abdomen up and the tail section facing forwards in the movement direction of the conveyor belt 20. The fish 50 can be dropped arbitrarily down onto the conveyor belt 20 from the receiving unit 12, such that the fish lies in an unspecified or specified area on the conveyor belt 20.

The conveyor belt 20 can comprise a number of carriers 22 for the fish 50 and which has a shape that centres the fish 50. The carriers 22 can form a V-formed duct so that the fish 50 is lying stable. The carriers 22 or the V-formed duct can possibly be formed in any way, but in the form shown the carriers 22 are formed by several upwardly extending and subsequent pairs of support arms 22a, 22b for the establishment of an approximately V-formed duct, such as particularly shown in FIG. 4. The conveyor belt 20 can be a continuous chain, where each chain link is equipped with respective support arms 22a, 22b. The support arms are placed next to each other and each support arm 22a, 22b can have a first upwardly extending part and a second deflected part for the formation of said V-formed duct.

In a further embodiment (not shown) the conveyor belt 20 can be formed so that it comprises an under-lying conveyor belt and two conveyor belts placed side by side, which approximately form a V-form with the under-lying conveyor belt, such that an approximately V-formed duct is provided, in which the fish lies stable. Alternatively, the under-lying conveyor belt can be omitted so that the bottom is formed by the lower part of the two side by side and tilted conveyor belts or that a metal or plastic duct is used in the bottom. The two side-by-side conveyor belts can also be used as barriers for the fish 50.

Furthermore, the conveyor belt 20 comprises several holding devices 24, where each holding device 24 in one embodiment comprises a pair of wedging arms 24a, 24b adapted to receive and firmly wedge or firmly hold the head of or the tail section of the fish 50. As shown in the figures, it is preferably the tail section 52 of the fish that is held or wedged firmly in the holding device 24. Said wedging arms 24a, 24b are placed side by side, corresponding to the support arms 22a, 22b and on a respective chain link, where each wedging arm 24a, 24b comprises a first, upwardly extending section and a second, in the main, horizontal section, i.e. a forward extending section. The second mainly horizontal section of each wedging arm 24a, 24b can resemble fingers that extend forwards in the movement direction of the conveyor belt 20, as shown in the figures. These fingers will then be able to grip the part of the fish 50 that is pushed in between the fingers. Alternatively, the second, in the main, horizontal section, i.e. the fingers of each wedging arm 24a, 24b, can extend to the rear in the movement direction of the conveyor belt 20. Furthermore, the wedging arms 24a, 24b, at least the horizontally extending section, can be placed in a V-shape so that the fish 50 is more easily wedged and held in place.

Several holding devices 24 are placed mutually spaced apart on the conveyor belt 20, where the distance between respective holding devices 24 is adjusted to or decided by the length of the fish 50. As shown, for example in FIG. 1, the distance between the holding devices 24 is greater than the length of the fish.

The holding devices 24 can consequently be formed in one embodiment as a wedging unit. The holding devices 24 can in another embodiment be formed as a clamping device. In a further embodiment, the holding devices 24 can be formed as a penetrating or piercing device.

Figure 6:
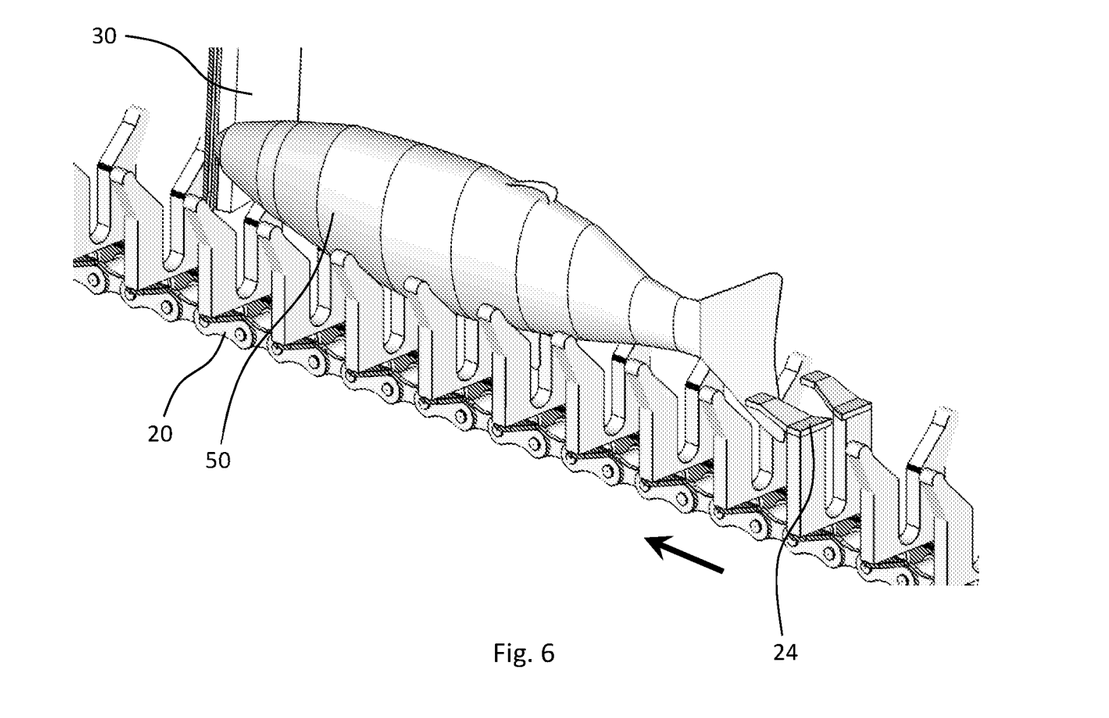
FIG. 6 shows in perspective fish that is transported on the conveyor belt in the gutting machine as the fish hits the barrier.
Figure 7:
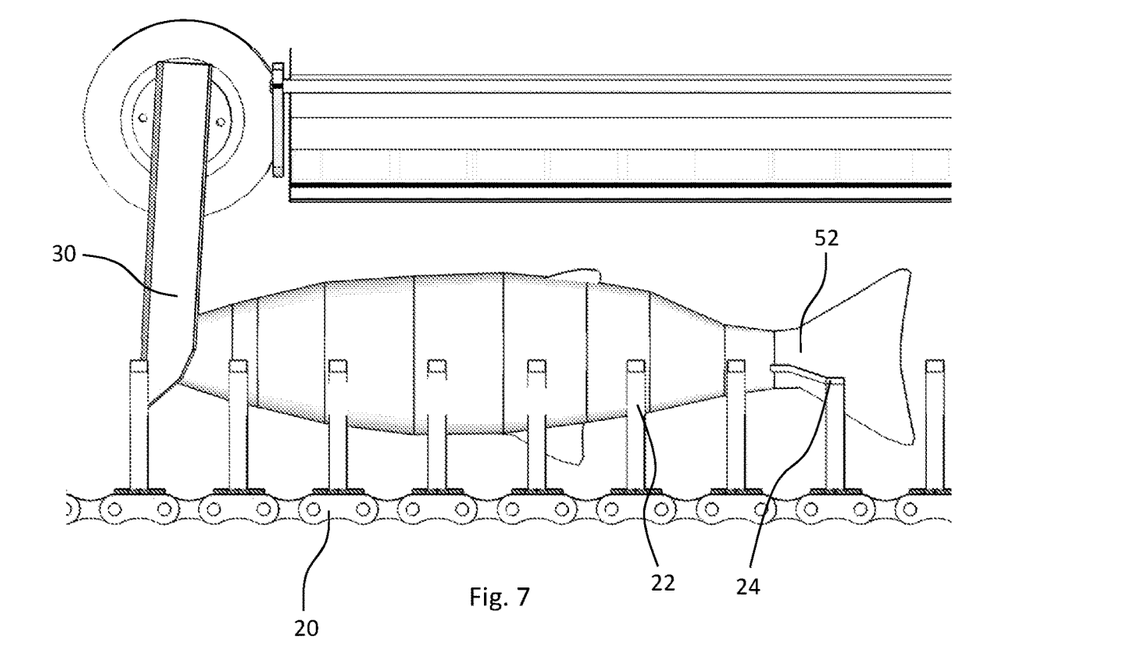
FIG. 7 shows fish that is transported on the conveyor belt in the gutting machine as the fish is held back and held firmly on the conveyor belt.

Furthermore, the gutting machine 10 comprises one or more barriers 30 to slow down the movement of the fish 50 on the conveyor belt 20 until the fish 50 is wedged firmly or held firmly in the holding device 24. In one embodiment, the barrier 30 can be formed as a downward extending stopping unit. The barrier 30 is placed adjoining the conveyor belt 20 and is likely to be able to rotate over the conveyor belt 20. Furthermore, the barrier 30 can be connected to a motor 30a or the like, and at a given torque or force permits a rotary movement by the barrier 30, which can drive the barrier in place after the fish has passed. As shown, for example in FIGS. 6 and 7, the barrier contributes to slow down the movement of the fish 50 with respect to the conveyor belt 20 until the fish 50 is brought along and is held firmly in a respective holding device 24 so that it is brought further with the conveyor belt 20 in its direction of movement. In FIG. 6 the movement of the fish 50 is slowed down and it can be seen that the tail section 52 of the fish approaches the holding device 24. In FIG. 7 the tail section 52 of the fish is clamped or wedged firmly between the wedging arms 24a, 24b of the holding device 24.

The barrier 30 and the respective holding devices 24 contribute to the firm wedging or firm holding of the part of the fish 50 that faces the direction of movement of the conveyor belt 20 so that the fish 50 is pushed by the conveyor belt 20 and not pulled along.

After the barrier 30 has slowed down the movement of the fish 50, the barrier 30 is adapted to rotate to let the fish 50 pass. During this rotary movement| the barrier 30 will follow the shape of the fish 50 and the size and profile of the fish can be decided based on the reading of the obtained data. For this reason the barrier 30 can comprise one or more sensors (not shown) to register the movement of the fish 50, and also to determine the size and profile of the fish 50. Other equipment to determine the size and profile of the fish can also be used.

Figure 9:
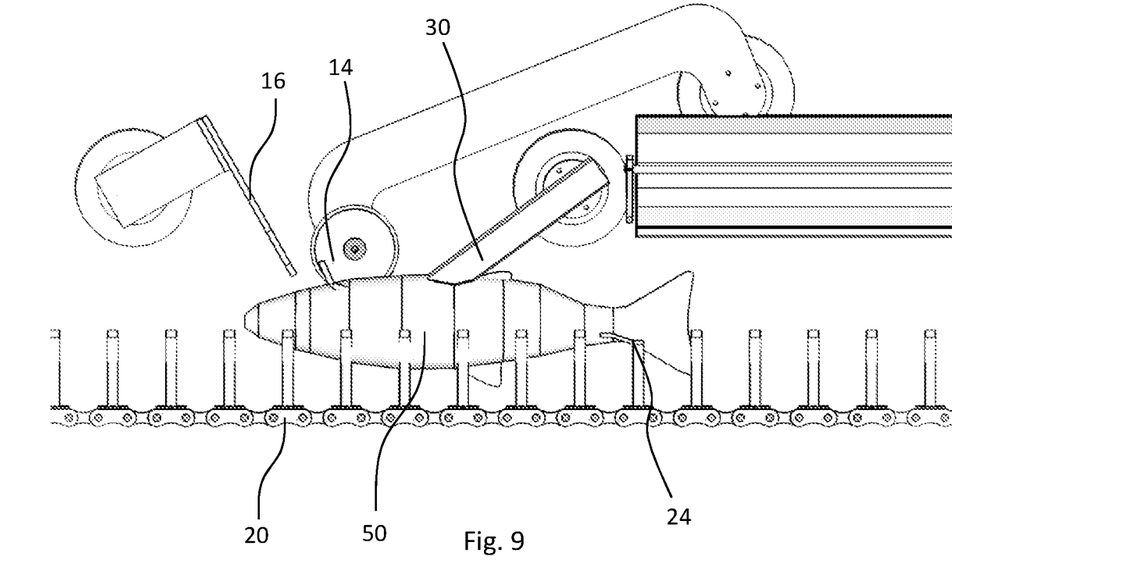
FIGS. 9-11 show the steps in the gutting process of fish that is transported on the conveyor belt in the gutting machine.
Figure 10:
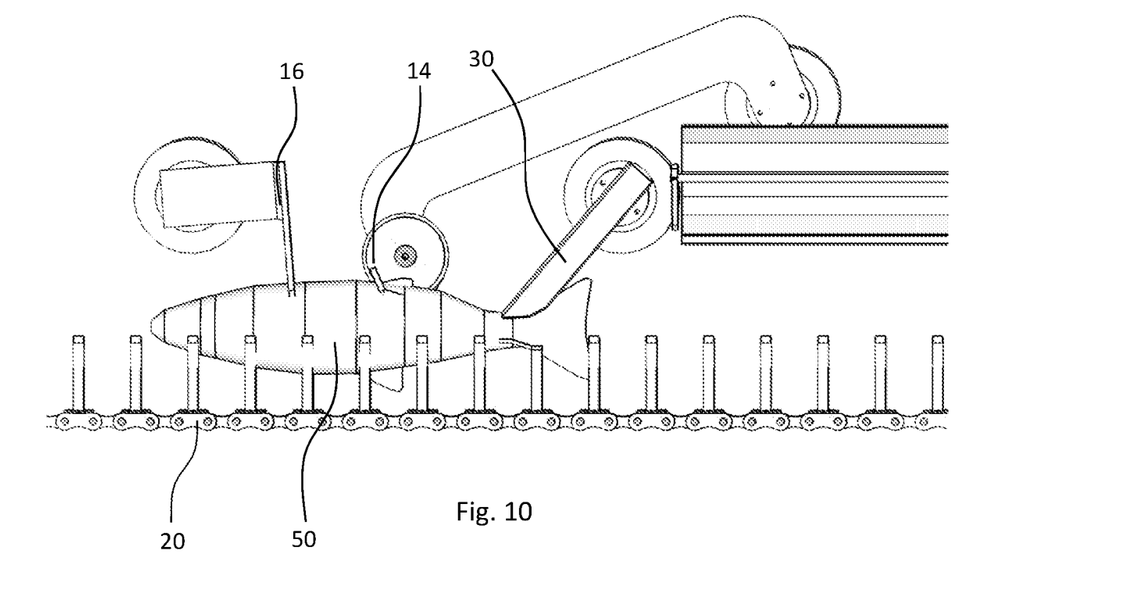
Figure 11:
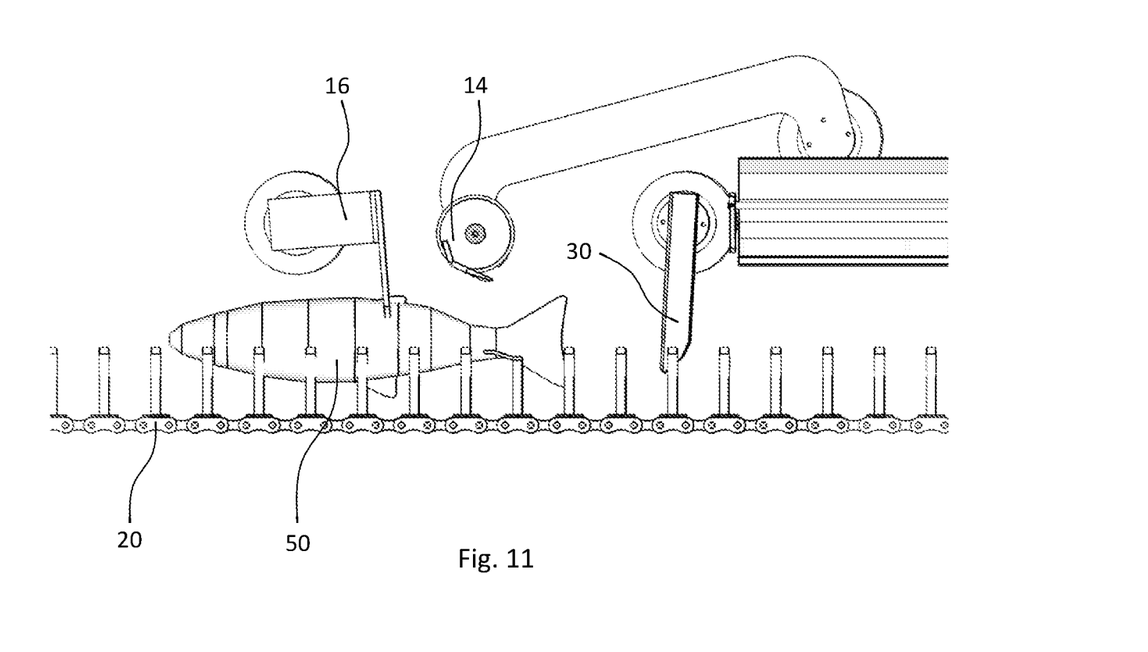

On a signal from said sensors in or at the barrier 30, the cutting and cleaning tools 14,16 can start the gutting process of the fish 50 as shown, for example in the FIGS. 9-11.

In other embodiments, the barrier can be formed differently from what is shown in the figures.

For example, the barrier can be formed as a second conveyor belt (not shown) arranged above in at least parts of the conveyor belt 20 that supports the fish 50.

The barrier in the form of a second conveyor belt can be lowered down to a position over and towards the fish 50 so that the movement of the fish is slowed down. The size and profile of the fish 50 can correspondingly be determined with the help of suitable equipment, such as photographic equipment and analytical tools.

For example, the barrier can be formed as two conveyor belts (not shown) arranged side by side with the conveyor belt 20 that supports the fish 50. The two side-by-side conveyor belts can be placed or be adapted to be taken to a position against and on respective sides of the fish 50 so that the movement of the fish is slowed down. The size and profile of the fish 50 can be correspondingly determined with the help of appropriate equipment such as photographic equipment and analytical tools.

FIG. 2-11 show, in addition to details of the gutting machine 10, the gutting process. In the following, the gutting process is described in accordance with the enclosed figures, where a wedge unit is being used as a holding device. For clarification the wedge unit is therefore referred to with the same reference number as the holding device. The process can also be carried out corresponding to the equipment described but not shown.

Figure 2:
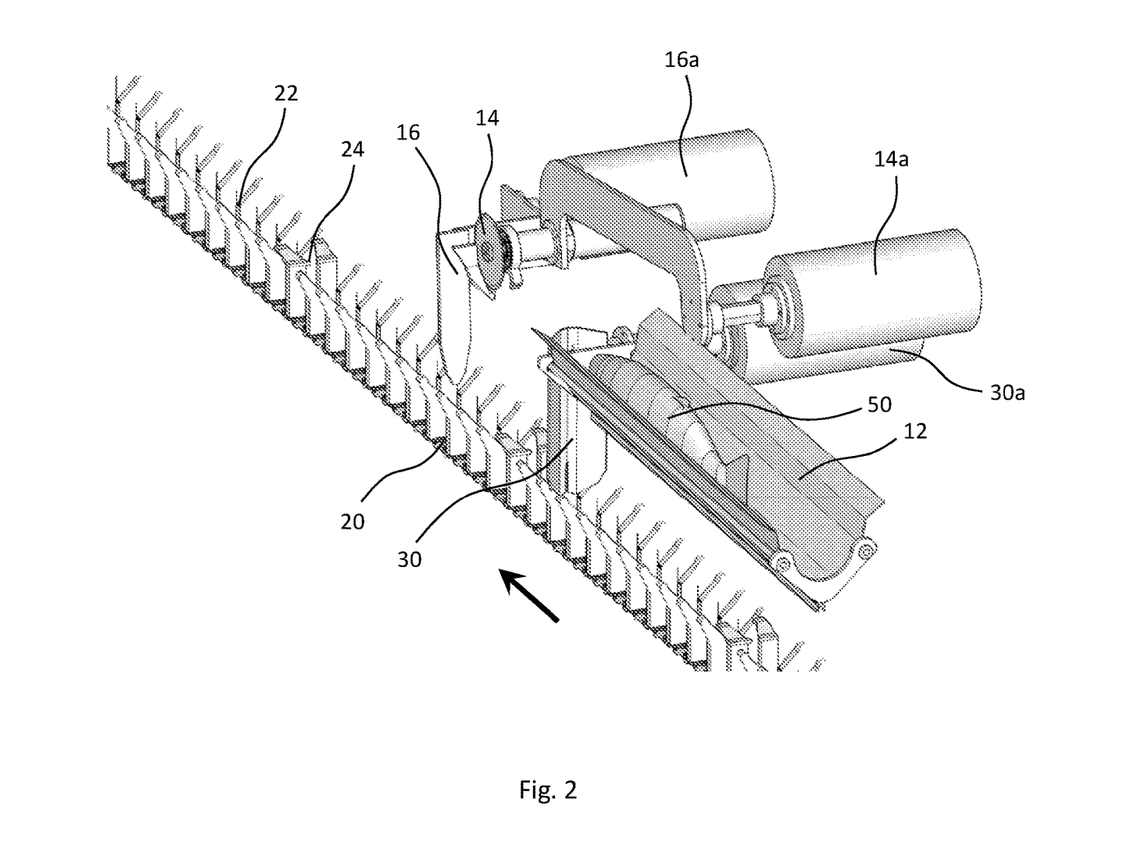
FIG. 2 shows fish that is received in a receiving unit above the conveyor belt in the gutting machine.
Figure 3:
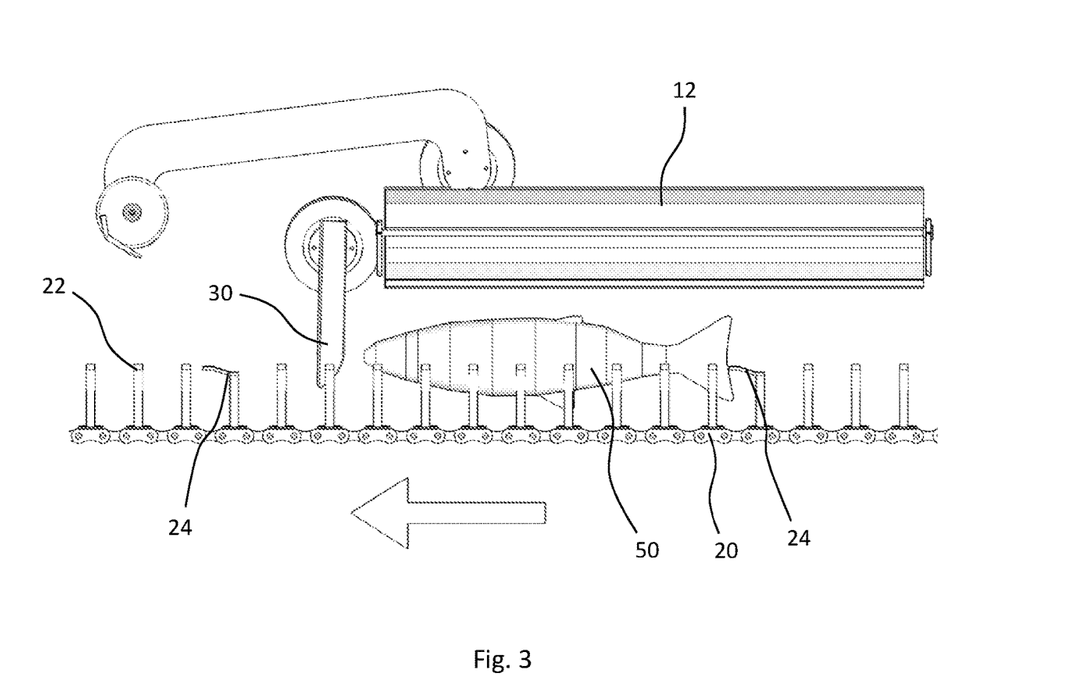
FIG. 3 shows fish that has fallen down onto the conveyor belt in the gutting machine before the fish meets a barrier.
Figure 4:
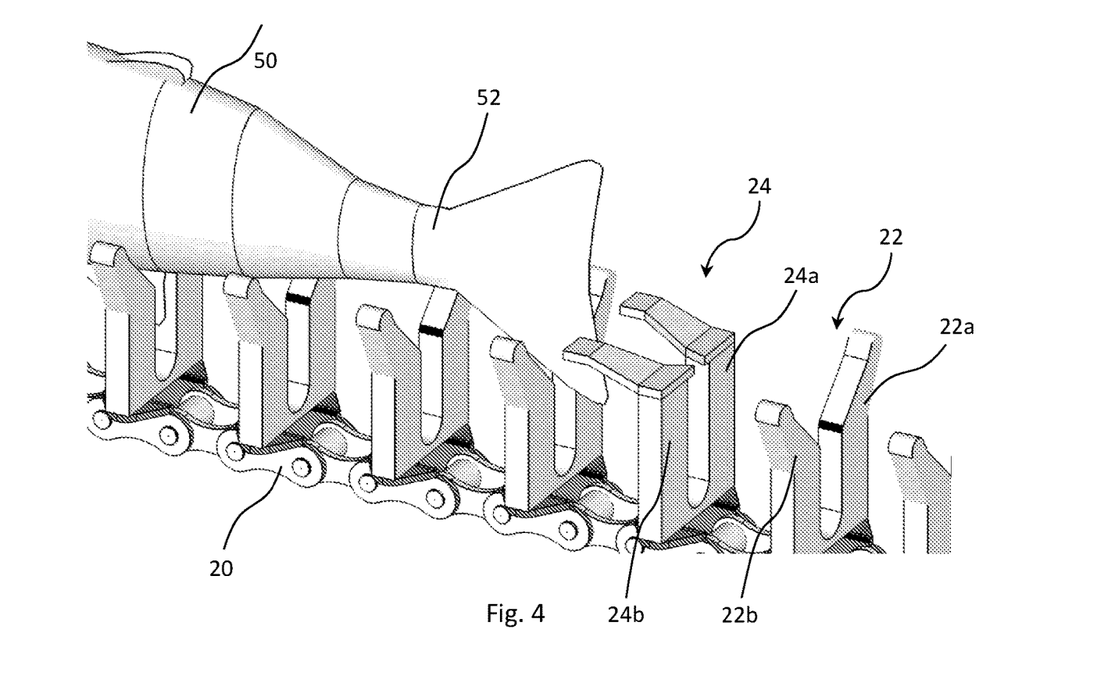
FIG. 4 shows a section of fish on the conveyor belt in the gutting machine before the fish is held firmly on the conveyor belt.
Figure 5:
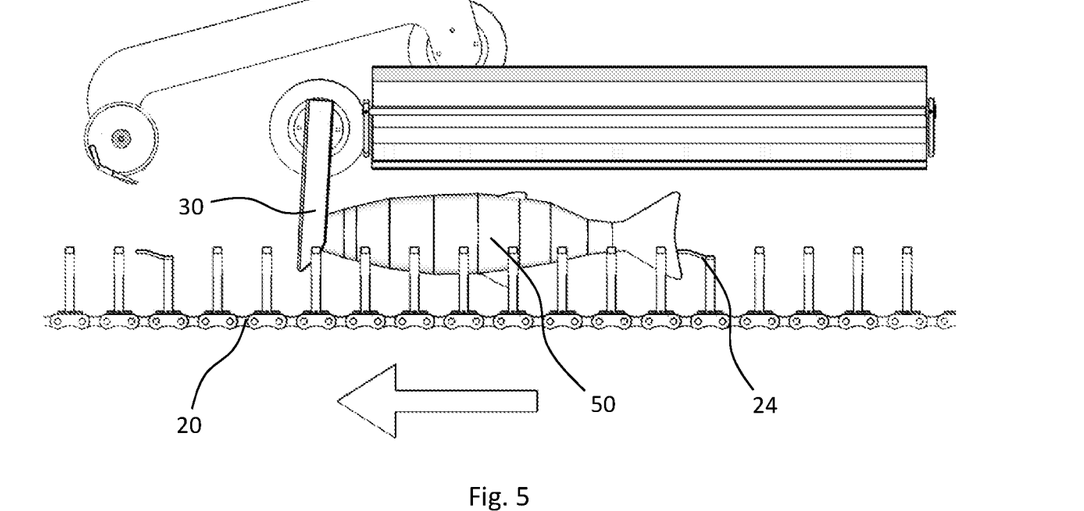
FIG. 5 shows fish that is transported on the conveyor belt in the gutting machine as the fish meets a barrier.

In FIG. 2 a fish 50 is received in the duct-formed receiving unit 12. The receiving unit 12 can be opened such that the fish 50 is dropped down onto the conveyor belt 20. The conveyor belt 20 can be running or it can start on a signal when the fish is dropped down. In FIG. 3 the fish 50 is dropped onto the conveyor belt 20 and rests in the V-formed carrier duct 22 formed by the support arms 22a, 22b, but the fish 50 is not yet firmly wedged. It can be somewhat arbitrary where the fish lands on the conveyor belt 20 and the fish can, for example, be lying as shown in FIGS. 3 and 4, i.e. with the tail section 52 at a distance from the wedge unit 24. In FIG. 5, the head of the fish 50 pushes against the barrier 30 and the fish 50 is held back while the conveyor belt 20 runs. FIG. 6 shows in a way the same as FIG. 5, but in perspective. In FIG. 7, the tail section 52 of the fish is wedged in the wedge unit 24 and the fish 50 is brought along by the conveyor belt 20.

Figure 8:
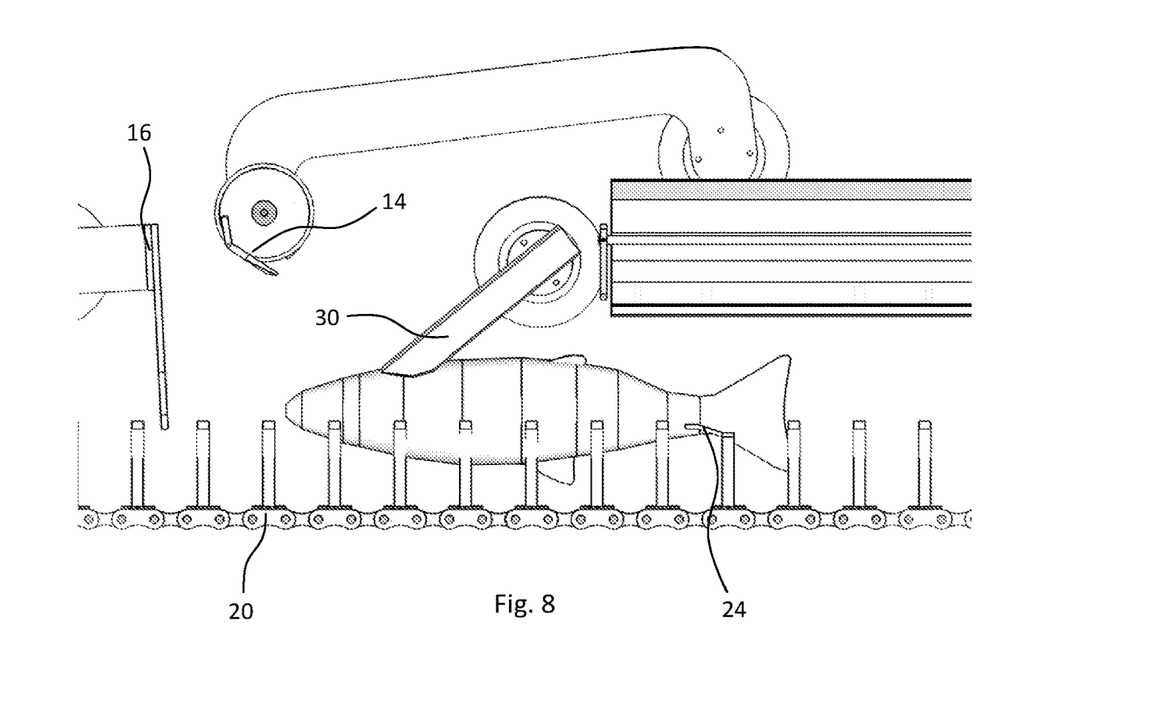
FIG. 8 shows fish that is transported on the conveyor belt in the gutting machine during its passage passed the barrier and before the gutting process has begun.

In FIG. 8, the barrier 30 has been rotated to let the fish 50 pass at the same time as the size and profile of the fish are determined. From the data that has been read with the help of the sensors, the size and profile of the fish 50 can be determined by the use of known algorithms and data analyses. The barrier 30 and the cutting and cleaning tools 14,16 can consequently be connected to a control unit (not shown) fitted for this purpose. The control unit will naturally also be able to control and regulate the other parts of the gutting machine 10. The fish can thereby be processed optimally.

The FIGS. 9-11 show the gutting and cleaning process. In FIG. 1, the barrier 30 has gone back to its starting position, i.e. to a mainly vertical position and the gutting machine 10 is ready to receive a new fish on the conveyor belt 20 to repeat the process.

The barrier 30 can also have a form such that it holds the fish 50 centered on the conveyor belt, as shown in FIGS. 9 and 10. FIG. 6 shows that the barrier 30 can have at least a partially internal arch shape.

The gutting tool 14 in the form of, for example, a knife/sprig as shown in FIG. 9 will go down at the head or anal opening and cut the fish 50 against the anal opening or head with regard to information from a sensor in the barrier 30. One can choose, if it is preferred, to have a princess cut or finish the cut somewhere else. The gutting tool 14 has a shape that it holds the abdomen cavity of the fish centered and open. The cutting tool 16 goes down and cuts the esophagus and loosens the entrails.

Thereafter all the entrails are removed either by vacuum suction and/or by being taken out. The kidneys are cut and removed by one or more mechanical devices, or a device can be used with a vacuum that removes the kidneys. The fish then goes out of the gutting machine 10. All information about the fish can be stored for subsequent analysis and registration.

The invention claimed is:

1. A machine (10) for gutting fish (50) having a head and a tail, comprising
   a conveyor belt (20) for receipt of fish (50) and a number of cutting and cleaning tools (14,16), where the fish is placed with the abdomen facing said cutting and cleaning tools (14,16) for gutting and cleaning of the fish (50) when it is transported on said conveyor belt (20) in a direction of movement of the conveyor belt (20);
a plurality of wedge-shaped holding devices (24) on the conveyor belt (20), each holding device (24) configured to receive and wedge a head or tail section of the fish (50),
one or more barriers (30) arranged adjoining and above said conveyor belt (20), the one or more barriers (30) being a downward extending and rotatably stopping unit configured for acting on the fish (50) and adapted to slow down movement of the fish (50) until the fish (50) is wedged in one of said holding devices (24) and is brought by the conveyor belt (20) in the direction of movement of the conveyor belt (20) and to the cutting and cleaning tools (14,16).

2. The gutting machine (10) according to claim 1, wherein each of the wedge-shaped holding devices (24) comprises a pair of upwardly extending wedging arms (24a, 24b) for receiving and wedging the head or tail section of the fish (50).

3. The gutting machine (10) according to claim 2, wherein said wedging arms (24a, 24b) are positioned side-by-side and each comprises a first section that extends upwardly and a second section that is substantially horizonal.

4. The gutting machine (10) according to claim 3, wherein the second section of each wedging arm (24a, 24b) extends to the front or to the rear, in the direction of movement of the conveyor belt (20).

5. The gutting machine (10) according to claim 3, wherein said first sections of each wedging arm (24a, 24b) in each holding device (24) form an angle with respect to each other thereby forming a V-shaped wedge.

6. The gutting machine (10) according to claim 1, wherein the conveyor belt (20) comprises a plurality of carriers (22) to support the fish (50), said carriers (22) comprising several upwardly extending and consecutive pairs of support arms (22a, 22b) that provide an approximately V-shape duct.

7. The gutting machine (10) according to claim 1, wherein the barrier (30) is rotatable to allow the fish (50) to pass after slowing down the movement of the fish (50).

8. The gutting machine (10) according to claim 7, wherein the barrier (30) is adapted to generally follow the shape of the fish (50) during rotation, thereby determining a general size and profile of the fish (50).

9. The gutting machine (10) according to claim 8, wherein the barrier (30) comprises one or more sensors to register movement of the fish (50) to determine the general size and profile of the fish (50).

10. The gutting machine (10) according to claim 9, wherein said sensors in the barrier (30) send a signal to initiate operation of the cutting and cleaning tools (14,16) to start operating to gut the fish (50).

11. A method for gutting of fish (50) having a head and a tail in a gutting machine, said gutting machine (10) comprising a conveyor belt (20) to receive fish (50) and a number of cutting and cleaning tools (14,16) for gutting and cleaning the fish (50) when it is transported on the conveyor belt (20) in a running direction, comprising the steps of:
dropping fish (50) one-by-one arbitrarily onto the conveyor belt (20) with the abdomen facing said cutting and cleaning tools (14,16),
slowing and holding back the fish (50) via one or more barriers (30) positioned above the conveyor belt (20) after the fish (50) is received and lying on the conveyor belt (20),
wedging the fish (50) in a holding device (24) on the conveyor belt (20) and bringing the fish (50) along on the conveyor belt (20) in the running direction for subsequent gutting and cleaning by said cutting and cleaning tools (14,16).

12. The method according to claim 11, comprising a step of determining a general size and profile of the fish after the fish (50) is held firmly and brought along by the conveyor belt (20).

13. The method according to claim 11, comprising a step of determining a general size and profile of the fish (50) by the barrier (30) that rotates to follow the shape of the fish when the fish is moved passed on the conveyor belt (20).

14. The method according to claim 11, wherein the conveyor belt (20) is equipped with several holding devices (24) for holding the fish (50) firmly.

15. The method according to claim 14, wherein said holding device (24) grips and firmly wedges a portion of the fish that faces a direction opposite of the running direction of the conveyor belt (20) such that the fish (50) is stabilized and centered when it travels further on the conveyor belt (20).

16. The method according to claim 13, comprising a step of sending a signal to said cutting and cleaning tools (14, 16) to start gutting the fish (50) after the general size and profile of the fish (50) has been determined.

17. The method of claim 16, wherein the signal is sent from one or more sensors in the barrier (30) that register movement of the fish (50) to determine the general size and profile of the fish (50).

\* \* \* \* \*